(12) United States Patent
Westhoff et al.

(10) Patent No.: US 7,609,838 B2
(45) Date of Patent: Oct. 27, 2009

(54) METHOD OF TRANSMITTING DATA IN A NETWORK

(75) Inventors: Dirk Westhoff, Heidelberg (DE); Joao Girao, Heidelberg (DE)

(73) Assignee: NEC Corporation, Tokyo (JP)

(*) Notice: Subject to any disclaimer, the term of this patent is extended or adjusted under 35 U.S.C. 154(b) by 918 days.

(21) Appl. No.: 11/094,394

(22) Filed: Mar. 31, 2005

(65) Prior Publication Data

US 2005/0220306 A1 Oct. 6, 2005

(30) Foreign Application Priority Data

Mar. 31, 2004 (DE) ........................ 10 2004 016 580

(51) Int. Cl.
*H04L 9/00* (2006.01)
(52) U.S. Cl. ........................ 380/270; 713/153
(58) Field of Classification Search ................. 380/270
See application file for complete search history.

(56) References Cited

U.S. PATENT DOCUMENTS

| | | | |
|---|---|---|---|
| 6,088,689 A * | 7/2000 | Kohn et al. ............... | 706/10 |
| 6,988,208 B2 * | 1/2006 | Hrabik et al. .............. | 726/23 |
| 7,069,359 B1 * | 6/2006 | Nishimoto ................. | 710/100 |
| 7,119,676 B1 * | 10/2006 | Silverstrim et al. ......... | 340/531 |
| 2002/0078382 A1 * | 6/2002 | Sheikh et al. .............. | 713/201 |
| 2002/0133541 A1 * | 9/2002 | Sturtevant et al. .......... | 709/203 |
| 2003/0151513 A1 | 8/2003 | Herrmann et al. | |
| 2003/0233538 A1 | 12/2003 | Dutertre | |
| 2005/0140964 A1 * | 6/2005 | Eschenauer et al. ......... | 356/10 |

FOREIGN PATENT DOCUMENTS

| | | |
|---|---|---|
| JP | 5-252090 | 9/1993 |
| JP | 10-21485 | 1/1998 |
| JP | 2002-108945 | 4/2002 |
| WO | WO 01/26333 | 4/2001 |
| WO | WO 03/090411 | 10/2003 |

OTHER PUBLICATIONS

Sabbah et al., "An Application-Driven Perpesctive on Wireless Sensor Network Security", Oct. 2, 2006, ACM, pp. 1-8.*
Ren et al., "Secure and Efficient Multicast in Wireless Sensor Networks Allowing Ad-hoc Group Formation", 2003, IEEE, pp. 1-11.*

(Continued)

*Primary Examiner*—Matthew B Smithers
(74) *Attorney, Agent, or Firm*—Young & Thompson

(57) ABSTRACT

Method to transmit data in an ad hoc network or a sensor network with the network comprising a multitude of sensor nodes to sensor data, at least one aggregator node to aggregate the sensored data of at least a subset of the sensor nodes, and at least one sink node to collect the data of the aggregator node is characterized in—regarding a high level of security against attacks from outside while transmitting data, and regarding an economic energy consumption—that the sensored data is encrypted at the sensor nodes, that the encrypted data is transmitted to one of the aggregator nodes, that at the aggregator node an aggregation function is executed on the encrypted data, and that the result of the aggregation function is transmitted to the sink node and decrypted there.

12 Claims, 2 Drawing Sheets

OTHER PUBLICATIONS

Masatoshi Sekine et al.; Hierarchical Aggregation of Attribute Data in Sensor Networks; The Institute of Electronics, Information and Communication Engineers; Sep. 2003; pp. 1-6.

Joao Girao et al.; CDA: Concealed Data Aggregation in Wireless Sensor Networks; Jun. 2006; pp. 1-9.

* cited by examiner

METHOD OF TRANSMITTING DATA IN A NETWORK

BACKGROUND OF THE INVENTION

1. Field of the Invention

The present invention relates to a method of transmitting data in an ad hoc network or a sensor network with the network including a multitude of sensor nodes to sensor data, at least one aggregator node to aggregate the sensed data of at least a subset of the sensor nodes, and at least one sink node to collect the data from the aggregator nodes.

2. Description of the Related Art

Regarding the development and the ever growing increase of ad hoc networks and sensor networks respectively, the present method of transmitting data within these networks is of an ever increasing importance. One of the major requirements within wireless ad hoc networks and sensor networks is the aggregation of sensed data and its transport to a specific device.

All sensors of a sensor network are sensor nodes which communicate with each other in a wireless way and which consist in general of a probe, a processing unit, a communication device and a battery. The sensor nodes comprise the functionality of data acquisition, communication and computation on a minimum of space. To provide examples where sensor networks are used, monitoring and controlling machines, controlling (intra- and extra-corporal) health parameters or environment monitoring should be mentioned here. The range of application possibilities for sensor networks is almost infinite, though. In specific fields, such as examining the contamination of water or weather forecasting, for example, it is extremely advantageous that sensor nodes can be realized in miniature size and that they can easily be fixed and used in regions hard to access.

Critical parameters restricting under certain circumstances the application possibilities of sensor networks are in particular physically defined factors of the single sensor nodes, such as, for instance, the reach of their sender, processor power, battery capacity, existing storage space and the like. Since the single sensor nodes—in contrast to the sink node where the sensed data comes together—are physically restricted in many ways, the energy-efficient organization of the sensor network is of outstanding importance. In this context it first has to be stated that the transmission of all the sensed data to the sink node would cause by far too much data traffic, so the data is usually accumulated within the network at special nodes—the aggregator nodes—first. Sending all the sensed data to its final destination would result in a lifetime which would be unacceptably short since the energy consumption of the devices, i.e. the sensor node, during sending increases in a linear way with the amount of data to send.

Another important aspect which has to be taken into consideration when establishing a sensor network is a secure transmission of data. The platforms which form the base of the sensor nodes usually have a specific miniature design and it can not be assumed that they dispose of a tamper-resistant unit. Thus, a subset of sensor nodes of the network may be corrupted. The aggregator nodes, in particular, being intended for collecting data from sensor nodes of their neighborhood, are an attractive aim for attacks because there the sensed information of a whole region is available and consolidated. After an aggregation function has been executed on the received sensored data, the aggregator nodes transmit their results in a compressed form to the sink node.

FIG. 1 shows—as a scheme—a sensor network with a multitude of sensor nodes 1 being labeled according to their number by S1 to Sn. After a request from the sink node 2—which is a specific device with sufficiently big physical resources—, the n sensor nodes, S1 to Sn, send their sensored data, s1 to sn, to an aggregator node 3 in their neighbourhood.

For reasons of clarity, in FIG. 1—only one single aggregator node 3 is shown. The aggregator node 3 executes the aggregation function $y=f(s1, s2 \ldots, sn)$ on the sensored data S1 to Sn, and then sends the result y of the aggregation function f to the sink node 2.

In the scenario shown no encryptions take place at all, so a potential attacker can easily tap the single values s1 to sn as well as the sensored information of a whole region, i.e. the result y of the aggregation function f.

For some applications security concepts of some kind are a mandatory pre-requisite. Already existing approaches to enhance security of data transmission frequently bring about additional and too heavy data traffic on the wireless medium which renders an economic use in practice often impossible. Using simple hash functions, for example, creates eight bytes as additional data per packet. Considering the fact that in sensor networks usually current radio technology is utilized with a maximum packet size of 36 bytes and a maximum payload of 27 bytes, it becomes evident that even the usage of hash functions should be evaluated carefully. This example explains once more the sensitivity of utilization of current methods, regarding security aspects as well as maximum energy saving. All of the methods known have in common that their realization—regarding aspects of security related to data transmission—consumes too much energy which makes the utilization of secured sensor networks in practice uneconomical.

SUMMARY OF THE INVENTION

An objective of the present invention is to provide a method of transmitting data in an ad hoc network or a sensor network of a generic kind in such a way that the data transmission within the network realizes a high level of security against attacks from outside, combined with an economic energy consumption at the same time.

According to the invention, the aforementioned problem is solved by the feature of claim 1. According to this claim, such a method is characterized in that the sensored data is encrypted at the sensor nodes, that the encrypted data is transmitted to one of the aggregator nodes, that at the aggregator node, an aggregation function is executed on the encrypted data, and that the result of the aggregation function is transmitted to the sink node and is decrypted there.

According to the invention it has first been recognized that a high level of security of data transmission is achieved if the sensored data is encrypted directly at the sensor node and if the decryption takes place only at the sink node. In a way according to the invention, the encrypted data is transmitted to one of the aggregator nodes where an aggregation function is executed on the encrypted data, i.e. the aggregator node executes an aggregation function without knowing the real values—i.e. the cleartext values—of the sensored data. Then, in a way according to the invention, the result of the aggregation function is transmitted to the sink node and decrypted there. Such a method regularly concerns the concealed transmission of data.

Due to the method according to the invention, concealment of data is ensured, both for the data transmission as well as for data processing at the aggregator node. Furthermore, the security architecture as according to the invention requires only a minimum of additional resource consumption. Except for a few padding data which may possibly occur, the method according to the invention does not cause any further network traffic and hence no additional energy consumption due to expensive data transmission between the nodes involved.

In a preferred embodiment an encryption transformation is selected and the aggregation function is applied to the therefrom resulting encrypted data in such a way that the result of the decryption matches the result of the aggregation function—if executed on the unencrypted data of the respective sensor nodes. By this unambiguousness it is secured that there is always a correct result provided at the sink node.

In a concrete embodiment it can be provided that the encryption transformation is selected from the class of the so-called privacy homomorphisms. These are encryption transformations which map the results of concrete algebraic operations on the cleartext alphabet in a homomorphic way to the encrypted results.

In concrete, an addition, a subtraction, a multiplication or an inverse multiplication could be executed consequently if applied to the aggregation function. These functions can be executed either as cleartext operations on the cleartext alphabet or, correspondingly, as ciphertext operations on the ciphertext alphabet.

In the context of a concrete application, with the aggregation function, the average of the sensed data can be computed, for example, or the aggregation function can order "detect moving obstacle". Both functions can be represented by the operation of an addition. In addition to the aforementioned aggregation functions, further aggregation functions can be covered as well.

Regarding a particularly economic resource consumption, it can be provided that the sensor nodes do not send their sensored data in continuous operation to the sink node, but that the sink nodes send requests at certain—preferably predeterminable—intervals to the sensor nodes. Only if a sensor node receives a request from the sink node, it sends its data to an aggregator node in its neighbourhood.

There are several ways how to design and further develop the teaching of the present invention in an advantageous way. For this purpose, it is to be referred to the patent claims subordinate to patent claim 1 on the one hand, and to the following explanation of a preferred example of an embodiment of the invention illustrated by the figure on the other hand. In connection with the explanation of the preferred example of an embodiment of the invention by the aid of the figure, generally preferred embodiments and further developments of the teaching will be explained.

DESCRIPTION OF THE PREFERRED EMBODIMENT

Figure 1:
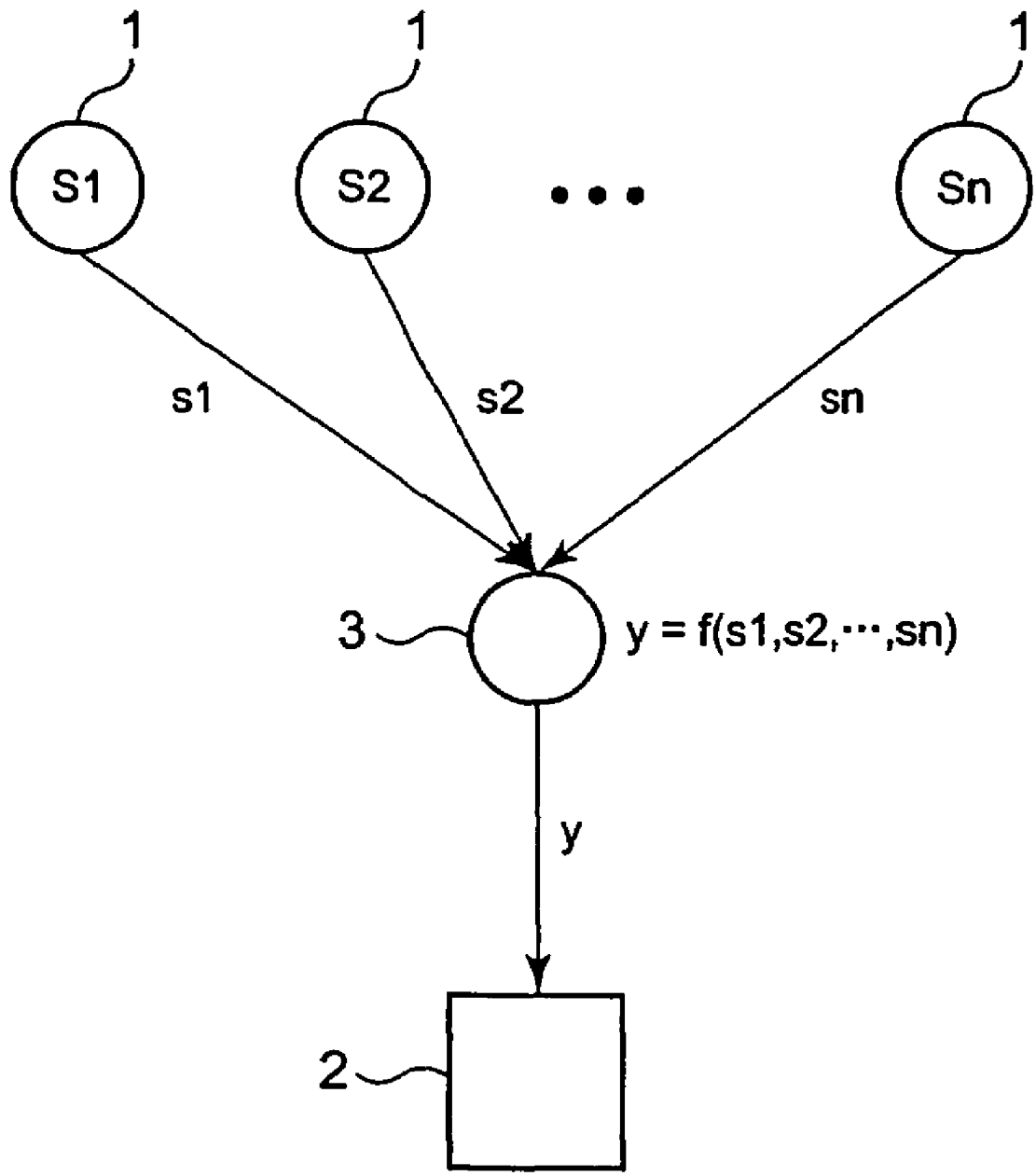
FIG. 1 shows a scheme of a sensor network with an unprotected data transmission.
Figure 2:
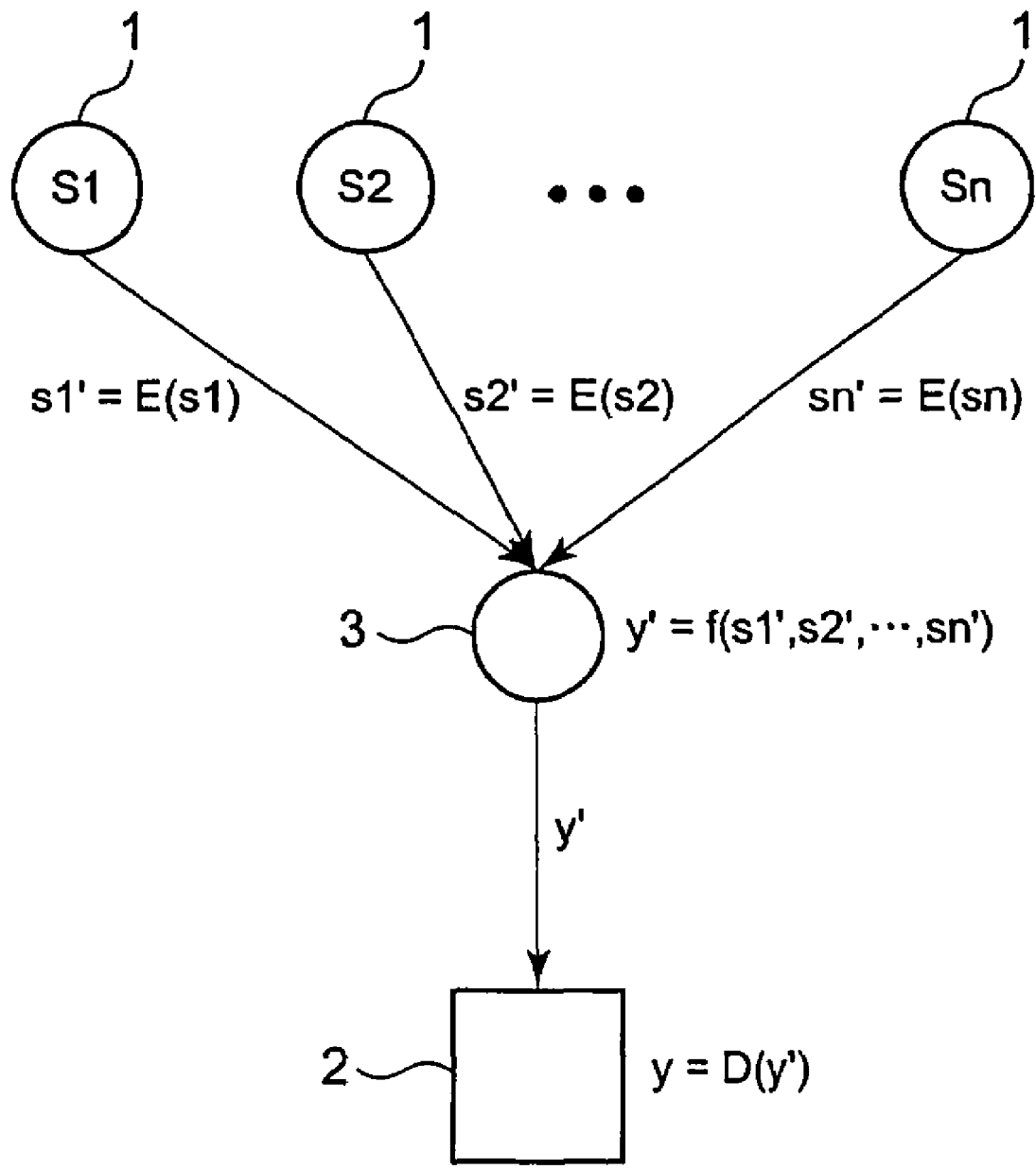
FIG. 2 shows a scheme of a sensor network using the method of data transmission as according to the invention.

FIG. 2 shows the same sensor network as FIG. 1, but is different in the sense that not an unprotected data transmission is shown, but a secure data transmission as according to the invention. In this case, at the sensor nodes S1 to Sn encryptions E are performed, so there is no longer unencrypted data s1 to sn sent to the aggregator node 3, but encrypted data s1'=E(s1) to sn'=E(sn). The aggregator node 3 then operates on the encrypted data and computes in the context of the application of the aggregation function f the value of y'=f(s1', ..., sn'). Afterwards, the aggregator node 3 transmits the result y' to sink node 2. At sink node 2 the decryption function D is executed to decrypt y', so the accumulated cleartext result y=D(y') is achieved.

With reference to FIG. 2, a special encryption transformation will be explained in the following wherein the aforementioned encryption transformation is picked from the class of privacy homomorphism:

The numbers p and p' are assumed to be large primes and the product q=pp' is public. The numbers p and p' are known to the single sensor nodes S1 to Sn as well as to sink node 2, but not to aggregator node 3. The value of q, in contrast, can be known to all of the parties. The aggregation function is known to the aggregator node 3 as well as to the single sensor nodes S1 to Sn. For the encryption $s_i'=E_p(s_i)$ of $s_i$ (with i=1, ..., n), an a/b from the cleartext set is selected, so $s_i=ab^{-1}$ mod p applies. The encryption is then computed as $s_i'=E_p(s_i)=ab^{-1}$ mod q. The aggregator node 3 can then compute for example y'=s1'+ ... +sn' and transmit y' to sink node 2. There, the decryption $y=D_p(y')$ is performed by selecting a fraction A/B from the set of the ciphertexts, so $y'=AB^{-1}$ mod q applies. Sink node 2 uses key p to compute $y=D_p(y')=AB^{-1}$ mod p.

As described before, the aggregation function can order "detect moving obstacle." For example, movements of an obstacle can be detected based on a difference in obstacle location data between adjacent sensors. More specifically, each sensor detects linear or area location data of obstacles with the presence or absence of each obstacle being represented by digital information "1" or "0." Accordingly, when detecting a difference between location data detected by adjacent sensors, it can be determined that moving obstacle exists.

Finally, it is particularly important to point out that the described example of an embodiment only serves as an illustration of the claimed teaching, but that it does by no means restrict the latter to the given example of an embodiment.

The invention claimed is:

1. A method for transmitting data in a network, wherein the network comprises a plurality of sensor nodes to sensor data, at least one aggregator node to aggregate sensored data obtained by at least a subset of the sensor nodes, and at least one sink node to collect data aggregated by the aggregator nodes, the method comprising:
    at each of the sensor nodes,
        encrypting the sensed data;
        transmitting the encrypted data to one of the aggregator nodes;
    at the aggregator node,
        executing an aggregation function on the encrypted data;
        transmitting the result of the aggregation function to the sink node; and
    at the sink node,
        decrypting the result of the aggregation function.

2. The method according to claim 1, wherein an encryption transformation is selected in such a way that when applied to the aggregation function the result of the decryption matches the result of the aggregation function if executed on the unencrypted data of the respective sensor nodes.

3. The method according to claim 2, wherein the encryption transformation is selected from the class of privacy homomorphisms.

4. The method according to claim 3, wherein an addition, a subtraction, a multiplication or an inverse multiplication is performed by the aggregation function.

5. The method according to claim 4, wherein the aggregation function is used to represent a computation of an average.

6. The method according to claim 4, wherein the aggregation function is used to represent a detection of a movement.

7. The method according to claim 1, wherein the sink node transmits a request to the sensor nodes at predetermined intervals.

8. The method according to claim 1, wherein the network is an ad hoc network.

9. The method according to claim 1, wherein the network is a sensor network.

10. A system for transmitting data in a network, wherein the network comprises a plurality of sensor nodes to sensor data, at least one aggregator node to aggregate sensored data obtained by at least a subset of the sensor nodes, and at least one sink node to collect data aggregated by the aggregator nodes, wherein each of the sensor nodes encrypts the sensored data and transmits the encrypted data to one of the aggregator nodes;

the aggregator node executes an aggregation function on the encrypted data, and transmits the result of the aggregation function to the sink node; and the sink node decrypts the result of the aggregation function.

11. The method according to claim 1, wherein the aggregator node and the sink node are separate physical nodes.

12. The system for transmitting data in a network according to claim 10, wherein the aggregator node and the sink node are separate physical nodes.

* * * * *

UNITED STATES PATENT AND TRADEMARK OFFICE
CERTIFICATE OF CORRECTION

PATENT NO. : 7,609,838 B2  Page 1 of 1
APPLICATION NO. : 11/094394
DATED : October 27, 2009
INVENTOR(S) : Westhoff et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1245 days.

Signed and Sealed this

Twelfth Day of October, 2010

David J. Kappos
*Director of the United States Patent and Trademark Office*